United States Patent [19]

Degen

[11] 4,424,733

[45] Jan. 10, 1984

[54] APPARATUS FOR AN AIRCRAFT FOR DROPPING OBJECTS

[75] Inventor: Max Degen, Lucerne, Switzerland

[73] Assignee: Schweizerische Eidgenossenschaft Vertreten Durch Die Gruppe Für Rüstungsdienste, Emmen, Switzerland

[21] Appl. No.: 220,825

[22] Filed: Dec. 29, 1980

[30] Foreign Application Priority Data

Sep. 29, 1980 [CH] Switzerland ............. 7264/80

[51] Int. Cl.³ .......................... F41F 5/02
[52] U.S. Cl. .................. 89/1.5 R; 89/1.816; 244/137 R
[58] Field of Search .......... 137/15.1; 60/270 R; 89/1.5 R, 1.5 H; 102/388; 244/137 R; 221/89, 289, 296, 297

[56] References Cited

U.S. PATENT DOCUMENTS

| | | | |
|---|---|---|---|
| 2,470,120 | 5/1949 | Walker | 244/137 R X |
| 2,723,093 | 11/1955 | Price et al. | 244/137 R |
| 2,790,304 | 4/1957 | Besserer | 137/15.1 X |
| 2,791,387 | 5/1957 | Weinberg | 244/137 R |
| 2,816,483 | 12/1957 | Johnston | 89/1.817 |
| 2,905,055 | 9/1959 | Camp et al. | 244/137 A |
| 2,913,198 | 11/1959 | Bonbrake | 89/1.5 R X |
| 3,056,335 | 10/1962 | Thiebolt | 89/1.5 R |
| 3,160,373 | 12/1964 | Taddonio | 244/137 R |
| 3,308,719 | 3/1967 | Myers | 89/1.5 R |
| 3,362,580 | 1/1968 | Chambers | 221/296 |
| 3,511,457 | 5/1970 | Pogue | 89/1.5 R X |
| 3,514,957 | 6/1970 | Evans | 60/270 |
| 3,547,000 | 12/1970 | Haberkorn et al. | 89/1.5 R |
| 3,964,391 | 6/1976 | Zacharin | 102/388 |
| 4,017,042 | 4/1977 | Jacobson | 244/137 R |
| 4,038,902 | 8/1977 | Welsh | 89/1.816X |

FOREIGN PATENT DOCUMENTS

| | | |
|---|---|---|
| 266328 | 12/1912 | Fed. Rep. of Germany . |
| 355161 | 6/1922 | Fed. Rep. of Germany . |
| 1277678 | 9/1968 | Fed. Rep. of Germany . |
| 1005077 | 4/1952 | France . |
| 499083 | 12/1970 | Switzerland . |
| 533284 | 2/1941 | United Kingdom . |
| 709300 | 5/1954 | United Kingdom . |

Primary Examiner—David H. Brown
Attorney, Agent, or Firm—Werner W. Kleeman

[57] ABSTRACT

To drop objects from a container or receptacle mounted at an aircraft there is beneficially employed a pressure head. For this purpose the object mounted internally of the container upon guide rails is impinged at its front end by the flight-pressure head of the aircraft, so that it is ejected from the tail end of the container. For rapidly realizing the necessary safety distance between the aircraft and the dropped object at the tail end of the container there is deflected a flow onto the departing object, so that a pressure pulse is applied to the object and it is accelerated. The invention is particularly suitable for accurately laying a multiplicity of objects at surface-like or areal targets i.e. upon a given terrain. Its use is contemplated for both civilian applications, such as dropping life saving and supporting equipment and so forth, and military applications, such as for dropping bombs, mines and other ordinance. The apparatus is extremely simple and functionally reliable. The only movable auxiliary means needed is a controllable bolt or equivalent structure within a blocking device for the release of the object.

10 Claims, 7 Drawing Figures

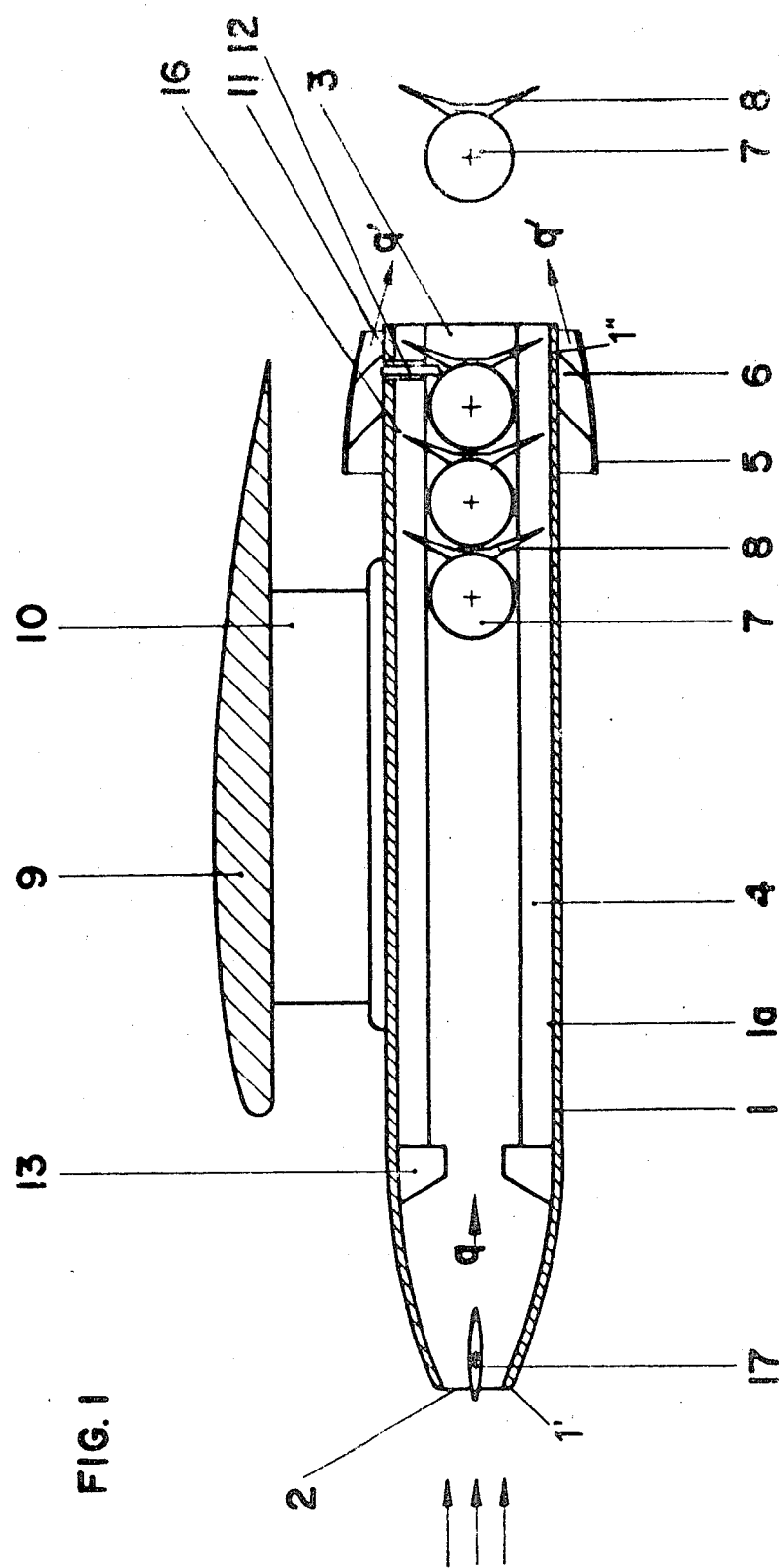

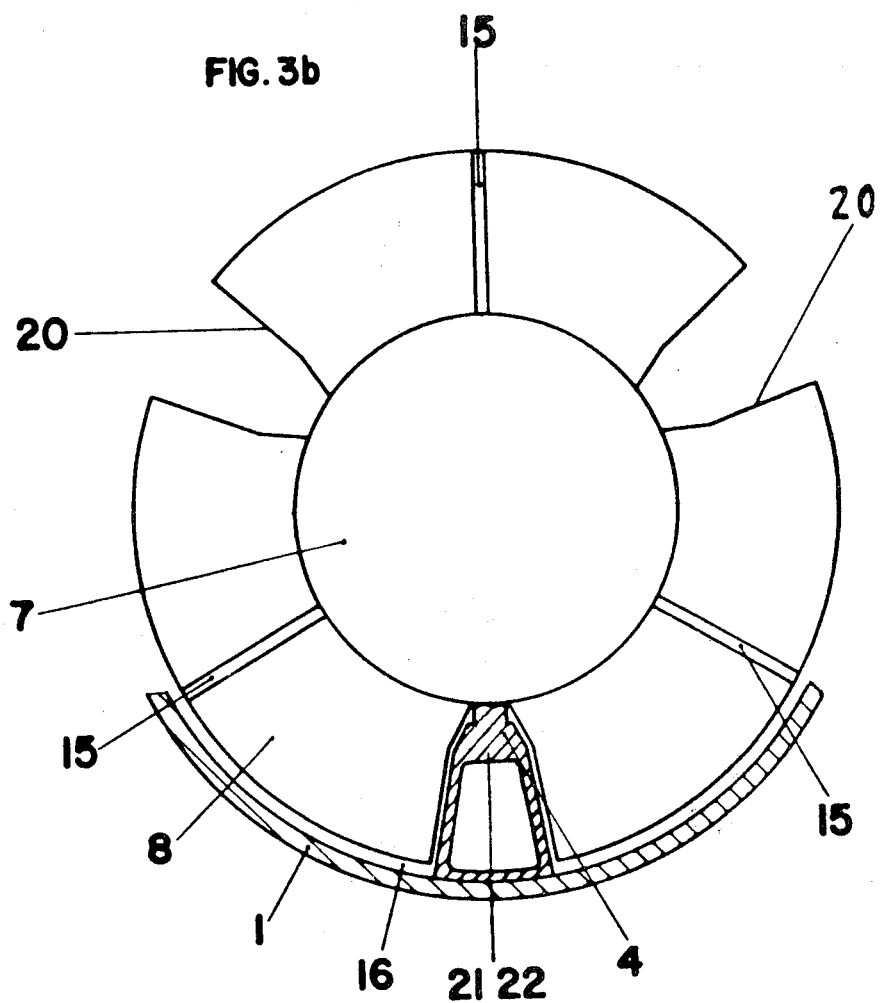

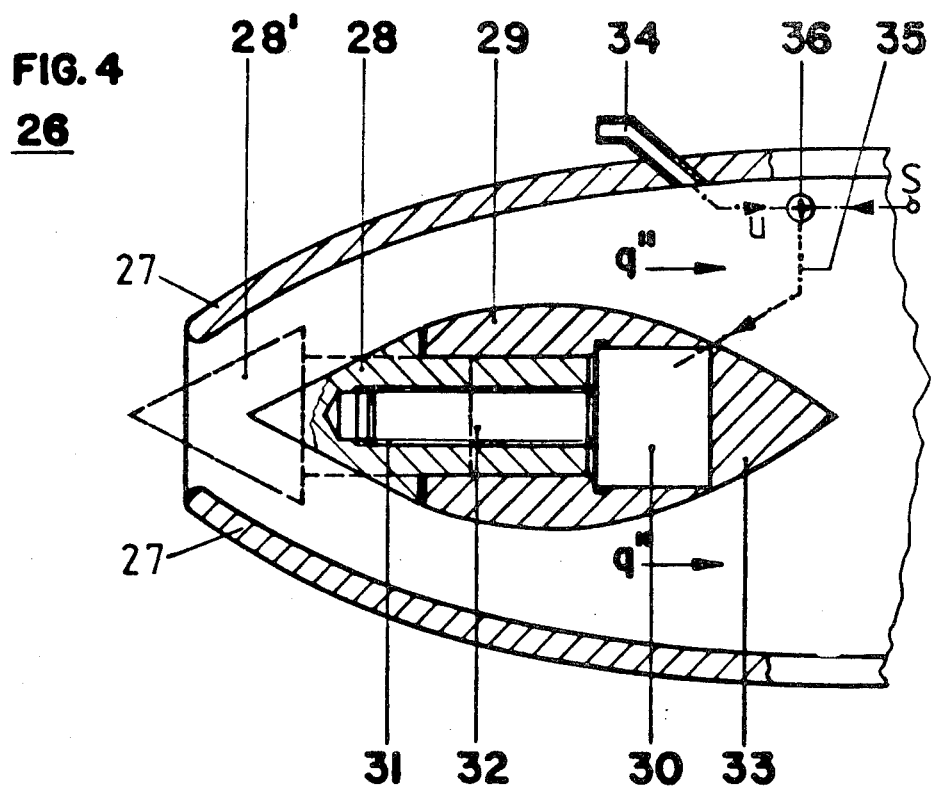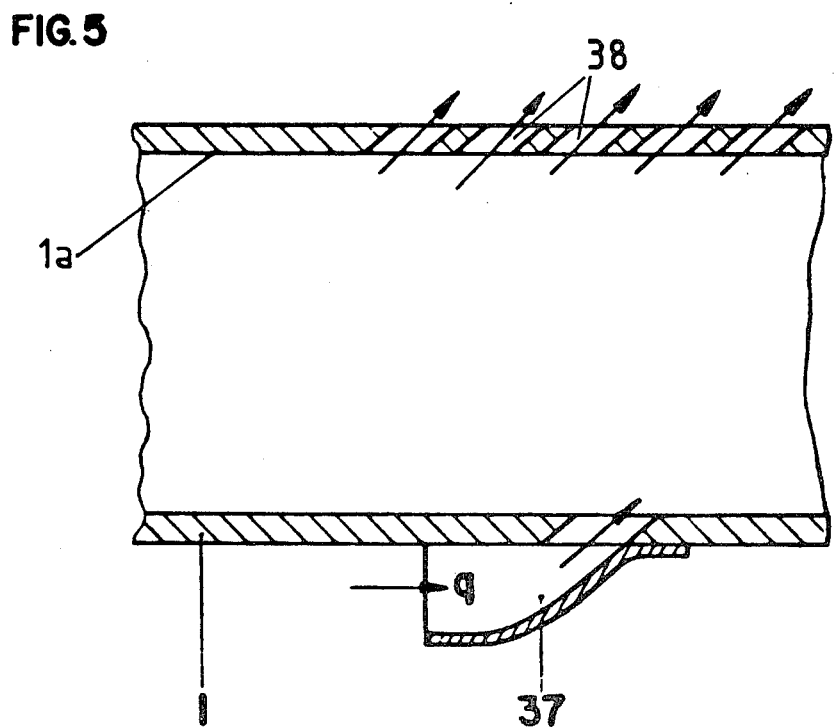

APPARATUS FOR AN AIRCRAFT FOR DROPPING OBJECTS

BACKGROUND OF THE INVENTION

The present invention relates to a new and improved construction of apparatus for use in conjunction with an aircraft for dropping the most sundry types of objects or the like, especially explosive objects, such as bombs, grenades and mines.

The apparatus of the invention is generally of the type which comprises a transport container mounted at the aircraft and containing therein at least one object intended to be released from the aircraft.

During civilian and military use of aircraft it is frequently desired to lay objects over surface-like targets or terrain, such as regions affected by a catastrophe, agriculture regions, gun or weapon emplacement positions, landing fields at airports and so forth. During the tactical employment of military aircraft there are employed for this purpose so-called bomb dumping or scattering containers mounted at the fuselage of the aircraft and after successful dropping of the bombs they are usually dispersed by pyrotechnical means (compare Armada International 1980, Volume No. 3, pages 130).

With such type systems there exists the difficulty of adequately delaying detonation of the usually small bombs, so-called bomblettes, after they have been ejected in order to maintain the requisite distance, needed as a margin of safety, between the released bombs and the aircraft. Additionally, for economical reasons, particularly when the equipment is used for non-combat tactical employment, reuse of the bomb dumping container is desired.

SUMMARY OF THE INVENTION

Therefore, with the foregoing in mind, it is a primary object of the present invention to provide a new and improved construction of apparatus which enables accurate surface-like laying of objects at an area or target, without endangering the maneuvering aircraft.

A further important objective of the invention aims at providing an object release or dropping apparatus, mounted at an aircraft, wherein such apparatus can be reused.

Now in order to implement these and still further objectives of the invention, which will become more readily apparent as the description proceeds, the apparatus of the present development is manifested by the features that the object mounted internally of the transport container is impinged at least during one time interval, prior to dropping of the object, and at least partially i.e. a portion of the object is impinged, with a flight-pressure head.

The apparatus of the invention is particularly characterised by its simplicity, both as to its fabrication and servicing. The impact or hit patterns appearing at the ground or target, especially when the objects are dropped at a low level, display advantageous scattering of the objects both over the length and width of the target area. Dropping of the objects does not result in any adverse affects upon the maneuverability of the aircraft and only causes minimum dynamic reactions.

According to a further feature of the invention the transport container can be of substantially cylindrical shape. At its front end it has a central air inlet and at its tail end at least one air outlet. With this design, the transport container can be constructed in an advantageous manner both from the standpoint of extreme economies in fabrication and also as concerns aerodynamic considerations.

The objects or the like can be mounted upon at least one guide rail, so that there is possible a precise ejection of the objects out of the transport container.

The transport container also could be designed to have at least one controllable blocking device which secures the object in axial direction against any displacement until the intended release of such object. This affords a particularly simple and remotely controllable release of the object.

According to a further design, it is possible to arrange a guide ring at the tail end of the transport container which deflects the external air flow onto the object which departs from the transport container. Through the use of this guide ring the object departing from the transport container has applied thereto an additional pressure pulse, so that the ejected objects do not undesirably mutually influence or even contact one another.

When the objects have a substantially cylindrical shape there is possible a high packing density of the objects within the transport container. Additionally, the cylinder-like objects can be retarded or delayed in their movements following ejection out of the transport cylinder by using simple aerodynamic measures, such as brake flaps, parachutes and so forth.

A further possibility is to have the object possess an at least approximately spherical or ball-shaped configuration which affords a favourable delay or retardation action, especially promoting easy stacking of the objects.

A brake guide or drag mechanism can be provided at the objects for additionally bringing about an intended delay of the objects.

Furthermore, damping fins or equivalent structure can be provided at such brake guide mechanism so that there can be prevented wobble or tilting movements of the object, when it is dropped or ejected, and therefore there can be avoided any dynamically unstable flight behaviour.

According to a further aspect of the invention a plurality of objects can be mounted in a stack-like fashion in axial direction within the transport container. The first object, viewed in the direction of aircraft flight, can be axially secured at the front-end wall of the container or at a stop upon a guide rail and the last object can be axially secured, until the desired time of release thereof, by a controllable bolt or equivalent structure provided at a blocking device. This construction particularly promotes the simultaneous surface-like or areal hitting of a target with a multiplicity of objects.

It is also possible to provide three guide rails mounted at an inner wall of the transport container, and to design the brake guide or drag mechanism of the object as a substantially plate-shaped structure having recesses for the through-passage of the guide rails. The object, under the action of its normal force or weight, acts upon two points or locations of at least a lower one of the guide rails. With this construction there is afforded maximum utilization of the space available in the transport container, there result lower friction losses upon ejection of the objects, and this design is aerodynamically advantageous.

Also a controllable flap member or equivalent structure can be provided which allows the aircraft-pressure head to flow into the interior of the transport container in a pulse-like fashion. Hence, the object mounted in the transport container can be optimumly accelerated by a rectangular or square wave pressure surge.

The optimum pressure which can be set throughout a wide range of the aircraft velocity within the transport container can be augmented by additionally regulating the flight-pressure head. Equally, this pressure can be predetermined in order to obtain a predeterminable object scattering pattern, or with only partial filling of the container this effect can be realised through the use of a throttle valve. The throttle valve controls or regulates the pressure in the transport container, resulting from the flight-pressure head, as a function of the flight conditions of the aircraft and/or the momentary velocity of the aircraft. Also, it is therefore possible to correct, during dropping of the objects, any possibly arising disadvantageous initial conditions caused by the momentary maneuvering of the aircraft.

The transport container also can be provided with at least one lateral air inlet and one lateral air outlet, which thus serve to influence the pressure course or conditions internally of the container. In this way it is possible to optimise the ejection behaviour of the objects.

It is also possible to provide an air gap between the inner wall of the transport container and the object and/or its brake guide or drag mechanism. This construction reduces the flow resistance of the transport container and additionally enables the realisation of greater machining tolerances in the system.

BRIEF DESCRIPTION OF THE DRAWINGS

The invention will be better understood and objects other than those set forth above, will become apparent when consideration is given to the following detailed description thereof. Such description makes references to the annexed drawings wherein:

FIG. 1 illustrates in schematic view a transport container mounted at a carrying wing of an aircraft during such time as there are dropped objects;

FIG. 2a illustrates in longitudinal sectional view a sleeve-like object for receiving life saving equipment or the like;

FIG. 3b illustrates the object of FIG. 3a in front view;

FIG. 4 illustrates a throttle valve having a regulation device for adjusting or setting a predetermined reduced pressure head; and FIG. 5 is a fragmentary sectional view of a transport container having a lateral air inlet and lateral air outlet.

DETAILED DESCRIPTION OF THE PREFERRED EMBODIMENTS

Figure 2A:
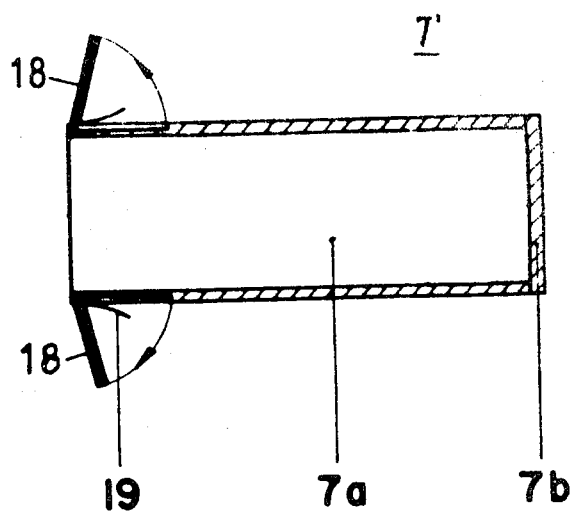

Describing now the drawings, in FIG. 1 there is shown a substantially cylindrical-shaped transport container 1 with a front-end tapering tip 1'. At the container tip 1' there is located an air inlet 2 in which there is rotatably mounted a flap member 17 or equivalent air flow-control structure. At the container rear or tail end 1" there is provided for the transport container 1 an air outlet or exit location 3. Arranged in a stack-like fashion upon transport rails 4 or equivalent structure are the objects 7 which are to be dropped. These objects 7 are each provided with a respective plate-shaped brake guide or drag mechanism 8. Internally of the transport container 1 there appears part of the flight-pressure head q of the aircraft when the flap member 17 is in its open position. Also, by referring to FIG. 1 it will be seen that a front wall or region of the transport container 1 is provided with abutment or stop means 13 as an abutment for axially securing the objects 7 at the front end of such transport container.

The transport container 1 is attached in known manner by means of a pylon 10 or the like at the aircraft wing 9 of the aircraft. At the tail end 1" there is arranged at the transport container 1 a guide ring 5 through which is guided an external air flow q', corresponding to the flight-pressure head q, this air flow being guided behind the tail or rear end 1" of the container 1. The air flow or current which builds-up within the transport container 1, following opening of the flap member 17 or the like, is capable of flowing towards the tail-end 1" of the container 1 between the inner wall 1a of such transport container 1 and an air gap 16 formed by damping fins 15 or equivalent structure provided at the brake guide mechanism 8, as best seen by referring to FIG. 3b. The point in time of release of the object 7, and thus dropping thereof, is determined by upwardly raising or otherwise appropriately displacing a release or control bolt 12 or equivalent structure arranged in a suitable blocking device 11.

The flap member 17 arranged within the transport container 1 can be continuously maintained in its open state or even omitted. By rapidly closing the flap member 17 at a suitable point in time it is however possible to produce a pulselike pressure course or condition within the container 1, so that there can be obtained an even more favourable ejection behaviour as concerns the dropping of the object 7.

Figure 2B:
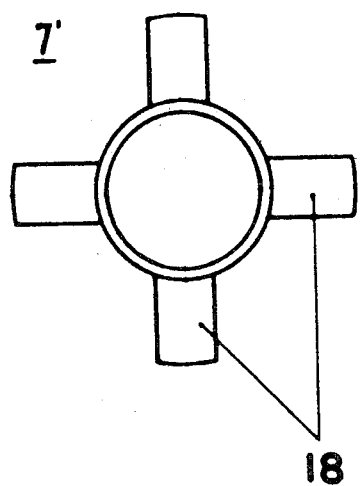
FIG. 2b illustrates the object of FIG. 2a during its free fall as viewed from the top.

The cylindrical-shaped object 7', shown by way of example in FIG. 2a, is provided at its front side with a flat end wall 7b. Internally of the object 7' there is located a relatively large charging space or volume 7a in which there can be stowed supply or life saving materials, such as for instance ammunition, inflatable rubber boats or dinghies, provisions and so forth. Brake flaps 18 which can be placed in an erected position in the direction of the arrows of FIG. 2a will be seen to be provided at the sides thereof confronting the cylinder-like object 7' with blade or leaf springs 19 which, upon departure of the object 7', serve as flight brakes and stabilisers in the manner illustrated in FIGS. 2a and 2b.

Figure 3A:
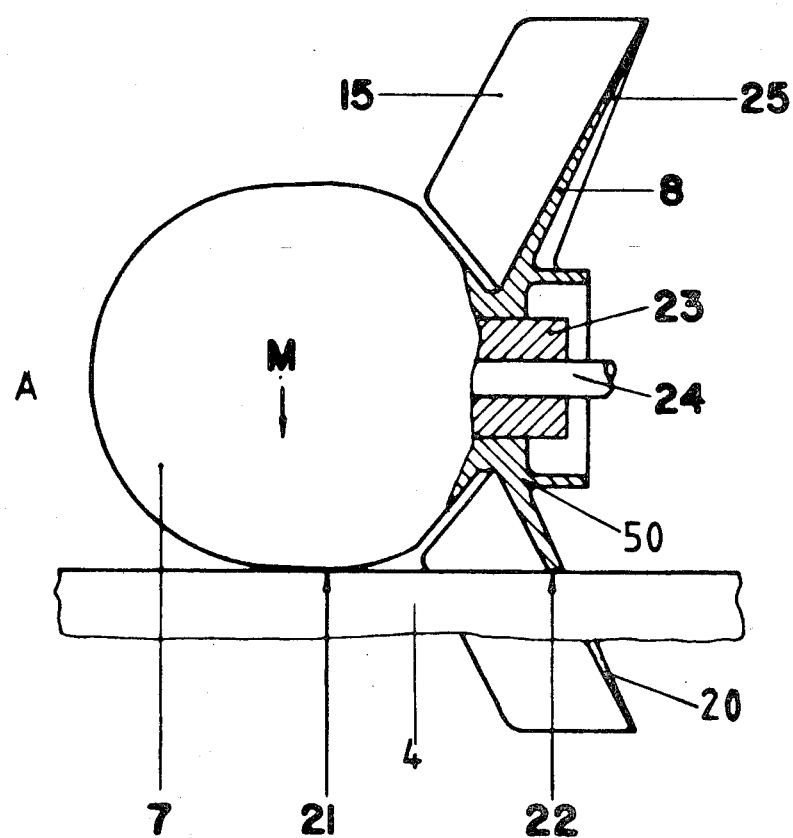
FIG. 3a illustrates a spherical-shaped object having a brake guide or drag mechanism and damping fins.

The ball or spherical-shaped object 7, for instance a bomb, illustrated in FIG. 3a, possesses at its tail end 50 a substantially plate-shaped brake guide mechanism 8 having damping fins 15 arranged perpendicular thereto and reinforcement ribs 25. The object 7 is supported upon a guide rail 4 at a first point or location 21 and also at a second point or location 22 of a recess 20 provided at the brake guide mechanism 8. Centrally of the brake guide mechanism 8 there is located a conventional ignition or detonation device 23, for instance a proximity fuze, having a fuze or ignition safety 24.

FIG. 3b is a fragmentary view showing the same object 7 as shown in FIG. 3a viewed from the side A. Once again there will be seen the substantially plate-shaped brake guide mechanism 8 with its damping fins 15 or the like. Extending through the three slot-shaped recesses 20 are the three guide rails 4, only the lowermost one of which has been particularly shown in FIG. 3b. The mass M is thus supported upon the two support or contact points 21 and 22 (see FIG. 3a) of the lower guide rail 4. The other upper guide rails 4 only serve for lateral guiding purposes.

Instead of using a simple flap member or flap valve 17, it also would be possible to provide a throttle valve 26, as shown in FIG. 4. With this modified construction there is controlled the flight-pressure head $q''$ which adjusts itself internally of the transport container 1. For this purpose there is provided an axially displacement valve body 28 having a central threaded bore 31. Within a teardrop or droplet-shaped constructed jacket or shell 29 there is located an electrical positioning or adjustment motor 30 which through running of the motor in the one or other direction can positionally adjust the valve body 28 by the action of a threaded bolt 32, through axial displacement thereof, at the required flight-pressure head $q''$. The end position (partially closed position) of the valve body 28 has been shown in broken lines and designated by reference character 28'. The positioning motor 30 is lined by a cover 33 which is aerodynamically favourable i.e. to the flow conditions. Electrical control lines or conductors 35 lead to a signal source having a reference value input S. At a pressure head tube or pipe 28 there is arranged a pitot tube 34 which delivers by means of a standard mechanical-electrical measuring transducer a measuring signal u proportional to the flight-pressure head. By means of a signal coupling or linking device 36 there is accomplished in conventional manner the switching thereof to the reference value signal S.

The control containing the measuring transducer, as illustrated in FIG. 4, can be accommodated, automated and/or programmed in conventional manner by suitable regulating means to the operating conditions, such as flight velocity, flight condition, filling state of the container, mass of the objects, friction conditions and so forth.

According to a variant embodiment which is simpler than that shown in FIG. 4 the flight-pressure head acting upon a piston is used itself in conjunction with a spring system and a damping device as is conventional in automatic pressure control.

The subject matter of the invention is particularly suitable as a simple low level dropping or release system for objects. In the case of tactical flight velocities of about 180 to 300 m/s it is possible to dispense with variation of the air entry or inlet cross-section of the transport container 1. Expansion of the field of use can be obtained in a simple manner by providing a variable inlet cross-section for the pressure head.

By means of additional openings, illustrated in FIG. 5, according to a variant construction of transport container 1, namely the lateral air inlet or inlets 37 and the air outlet or outlets 38, it is possible to optimise the ejection behaviour of the objects.

The design of such type lateral air inlet and outlet, in the first instance, is dependent upon the objects themselves, such as their form, mass, friction forces and so forth.

A particularly favourable ratio of the mass of the object to the unit resistance ($C_{W}F$) and thus a high delay of the object in relation to the aircraft is present. The surface-like laying of the objects at the target is extremely precise. The flight behaviour of the objects is extensively reproducible and stable.

The mass of the individual objects, e.g. bombs can be chosen without any impairment as to their action at the surface-like target such that the loading of the transport container can be accomplished without any great effort by a single person or operator.

The system manifests itself through its exceptional simplicity and the fact that it is relatively free of maintenance. The single required movable part of the transport container is the bolt or the like of the blocking device which is used for releasing the objects; for this purpose there has been found to be suitable a pyrotechnical activation.

While there are shown and described present preferred embodiments of the invention, it is to be distinctly understood that the invention is not limited thereto, but may be otherwise variously embodied and practiced within the scope of the following claims.

Accordingly, I claim:

1. An apparatus for an aircraft for dropping objects, especially explosive objects such as bombs, grenades and mines, comprising:
    a transport container capable of being carried by the aircraft in a stationary position relative to said aircraft;
    said transport container having a substantially cylindrical configuration which defines a lengthwise axis, a front end and a rear end;
    a plurality of substantially spherical objects having a favorable ratio of object mass to unit resistance;
    said objects being arranged in said transport container in a stacked configuration in the direction of said lengthwise axis;
    a plurality of guide rails for guiding said objects for movement through said transport container in the direction of said lengthwise axis;
    drag stabilizing means mounted at said objects;
    means for applying to said plurality of objects mounted internally of said transport container, at least during one time interval prior to dropping said objects in series and at least partially and directly at the series of objects, a flight-pressure head of said aircraft;
    said drag stabilizing means comprising brake guide means provided at each one of said objects;
    three of said guide rails being mounted in an angularly spaced relationship at an inner wall of said transport container;
    said brake guide means possessing a substantially plate-shaped configuration and having recess means for the through-passage of said guide rails;
    one of said guide rails defining at least a lower guide rail; and
    each one of said objects bearing under the action of its weight upon two points at least at said lower guide rail.

2. The apparatus as defined in claim 1, further including:
    guide ring means arranged at said rear end of said transport container; and
    said guide ring means deflecting an external air flow onto the object departing from said transport container.

3. The apparatus as defined in claim 14, further including:
    damping fin means arranged at said brake guide means.

4. The apparatus as defined in claim 1, wherein:
    said means for applying said flight-pressure head includes a controllable flap member which enables the flight-pressure head of the aircraft to flow in a pulse-like manner into the interior of said transport container.

5. The apparatus as defined in claim 1, further including:
throttle valve means for regulating the pressure in said transport container resulting from said flight-pressure head as a function of at least any one of the flight conditions, the momentary velocity of the aircraft, or both.

6. The apparatus as defined in claim 1, wherein:
said flight-pressure head-applying means comprises at least one lateral air inlet and a lateral air outlet provided for the transport container.

7. The apparatus as defined in claim 1, wherein:
said transport container has an inner wall, and an air gap provided between the inner wall of the transport container and the brake guide means.

8. The apparatus as defined in claim 1, further including:
at least one controllable blocking device provided for said transport container; and
said blocking device securing said objects in axial direction against any displacement thereof until the point in time of intended release of at least one of said objects through said rear end.

9. The apparatus as defined in claim 8, wherein:
said blocking device including a controllable bolt for axially securing that one of said objects which is positioned closest to said rear end of said transport container.

10. The apparatus as defined in claim 8, wherein:
a front wall of said transport container is provided with stop means which serve as an abutment to axially secure said objects at said front end of said container.

* * * * *